Oct. 5, 1937.  G. REICHENBERG  2,095,082

FORK FOR HOT POTATOES AND THE LIKE

Filed Feb. 4, 1937

INVENTOR
GUNDA REICHENBERG
BY
ATTORNEY

Patented Oct. 5, 1937

2,095,082

UNITED STATES PATENT OFFICE 2,095,082

FORK FOR HOT POTATOES AND THE LIKE

Gunda Reichenberg, Jackson Heights, N. Y.

Application February 4, 1937, Serial No. 123,958

3 Claims. (Cl. 30—322)

This invention relates to new and useful improvements in a fork for hot potatoes and the like vegetables.

The invention has for an object the construction of an implement as mentioned which is characterized by a handle portion supporting parallel pins adapted to be placed into the side of a potato and by which the potato may be supported.

Still further the invention proposes an arrangement by which the pins may be shifted relative to each other and maintain their parallel positions so that the fork may be suited for supporting potatoes of various sizes.

Another one of the objects of this invention is to so construct the potato fork that it is capable of supporting a hot potato irrespective of its size in a manner so that the potato will not break and fall off the fork while taking a potato out of a pot and also serves as a holder for peeling same.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Figure 1:
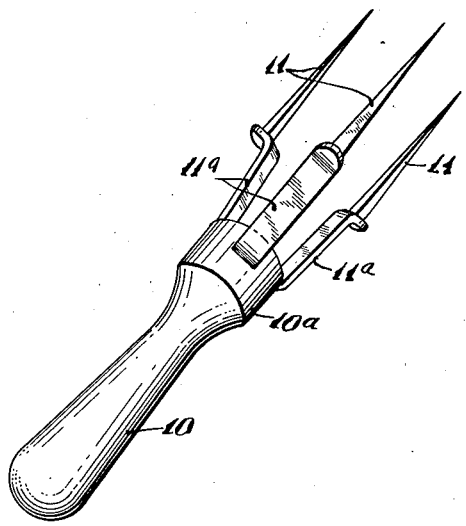
Fig. 1 is a perspective view of a hot potato fork constructed according to this invention.
Figures 2, 3, 4:
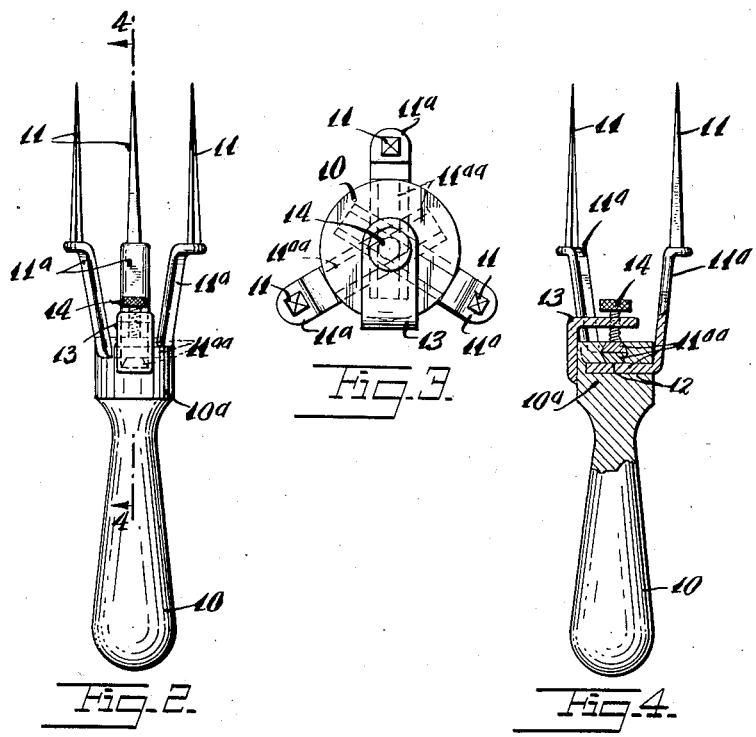
Fig. 2 is a side elevational view thereof.
Fig. 3 is a plan view thereof.
Fig. 4 is a fragmentary sectional view taken on the line 4—4 of Fig. 3.

The hot potato fork comprises a handle 10 having a top end portion 10a upon which several pointed elements 11 are supported in relatively parallel positions. These elements 11 preferably are present in the numerical quantity 3 and arranged upon a theoretical circumference, each spaced 120° from each other.

Each of the pins 11 has a shank portion 11a at its bottom end which extends downwards and which is directly mounted on the top end portion 10a of the handle and by which the pins 11 are supported. These shank portions have their outer ends arranged at right angles to the inner ends of the pins 11 and then have continuations forming body portions thereof extended downwards and converging towards each other to the top portion 10a of the handle.

The handle portion 10a is formed with super-imposed dove-tailed grooves 12 arranged radially from the center of the handle. The lower ends of each of the shank portions 11a are formed with tongue portions 11aa which engage into these dove-tailed grooves. There is a bracket 13 attached upon the side of the handle and extends over the center of the handle above the dove-tailed grooves 12. A clamp screw 14 engages through the bracket and against the topmost of the tongues 11a by which the tongues may be clamped in fixed positions.

It is possible to change the spacing of the pin elements 11 without interfering with the parallel relationship, by first loosening the clamp screw 14', then radially shifting the tongue portions 11a, and finally turning down the clamp screw 14 to again lock the shanks 11a in fixed positions.

The tongue portions 11aa cross right beneath the screw 14 and are of sufficiently soft material so that the pressure upon them from the screw 14 is sufficient to be transmitted from one to the other and allow all of the tongue portions 11aa to be clamped in fixed positions.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:—

1. A hot potato fork comprising a handle having a top end portion with super-imposed dove-tailed grooves crossing and radiating from the center thereof, and parallel pins with shank portions upon their inner ends, said shank portions being slidably mounted in said grooves.

2. A hot potato fork comprising a handle having a top end portion with super-imposed dove-tailed grooves crossing and radiating from the center thereof, and parallel pins with shank portions upon their inner ends, said shank portions being slidably mounted in said grooves, and means for locking said shank portions in adjusted positions in said grooves.

3. A hot potato fork comprising a handle having a top end portion with super-imposed dove-tailed grooves crossing and radiating from the center thereof, and parallel pins with shank portions upon their inner ends, said shank portions being slidably mounted in said grooves, and means for locking said shank portions in adjusted positions in said grooves, comprising a bracket attached on the side of said handle, and a screw threadedly engaging through the bracket and abutting against said shanks to clamp them in fixed positions.

GUNDA REICHENBERG.